United States Patent [19]

Hoster et al.

[11] Patent Number: 4,851,040
[45] Date of Patent: Jul. 25, 1989

[54] PROCESS FOR PRODUCING IRON FROM FINE-GRAINED IRON ORES

[75] Inventors: Irmgard Hoster; Thomas Hoster; Dieter Neuschütz, all of Essen; Dietrich Radke, Ratingen, all of Fed. Rep. of Germany

[73] Assignee: Fried. Krupp Gesellschaft mit beschränkter Haftung, Essen, Fed. Rep. of Germany

[21] Appl. No.: 89,419

[22] Filed: Aug. 26, 1987

[30] Foreign Application Priority Data

Aug. 30, 1986 [DE] Fed. Rep. of Germany ....... 3629589

[51] Int. Cl.$^4$ ............................................. C22B 5/14
[52] U.S. Cl. ........................................ 75/26; 75/38; 75/40; 266/160
[58] Field of Search ................ 75/26, 38, 40; 266/160

[56] References Cited

U.S. PATENT DOCUMENTS

| 3,936,296 | 2/1976 | Campbell | 75/26 |
| 4,007,034 | 2/1977 | Hartwig et al. | 75/38 |
| 4,045,214 | 8/1977 | Wetzel et al. | 75/38 |
| 4,215,101 | 7/1980 | Kriegel et al. | 75/26 |

FOREIGN PATENT DOCUMENTS 2702693 7/1978 Fed. Rep. of Germany .

OTHER PUBLICATIONS

Wicke, Hedden and Luth, "Reduktion von Feinerzen in zwei Stufen . . . ", Stahl und Eisen, 2/5/1959, pp. 129–134.

Primary Examiner—Melvyn J. Andrews
Attorney, Agent, or Firm—Spencer & Frank

[57] ABSTRACT

A process of producing iron from fine-grained iron ore by direct reduction, which includes adding oxygen, sponge iron and at least one of coal fines and low-temperature carbonized coal to an iron bath in a melt gasifier to produce a reducing gas, regulating the temperature of the reducing gas by blowing coal fines into it to produce a cooled reducing gas and a low-temperature carbonized coal, separating the low-temperature carbonized coal from the cooled reducing gas in order to use the separated low-temperature carbonized coal in the melt gasifier, preheating a fine-grained iron ore with a used reducing gas containing carbon monoxide to a temperature from 450° to 700° C., and reducing the preheated fine-grained iron ore with the cooled reducing gas at a temperature from 700° to 1100° C. in at least one fluidized bed to produce sponge iron and used reducing gas containing carbon monoxide, wherein the step of preheating the fine-grained iron ore results in decomposition of at least part of the carbon monoxide contained in the used reducing gas, producing a carbon layer on the preheated fine-grained iron ore, and also producing an exhaust gas and additional heat.

14 Claims, 3 Drawing Sheets

4,851,040

PROCESS FOR PRODUCING IRON FROM FINE-GRAINED IRON ORES

BACKGROUND OF THE INVENTION

The present invention relates to a process of producing iron from fine-grained iron ores.

It is known to produce iron from oxidic iron ores in a process in which the ore is initially converted by direct reduction with a suitable gas to substantially metallized sponge iron which, with the addition of additives and possibly scrap, is melted in a suitable vessel filled with a metal melt. In the melting vessel, the reaction of oxygen-containing gases with carbon-containing substances, particularly coal and/or coke dust—which are preferably blown into the metal melt below the bath surface—produces heat and a carbon monoxide-containing exhaust gas. Some of this heat is used to melt the sponge iron and the exhaust gas is used for the direct reduction.

In order to better utilize the quantities of substances and energy to be introduced into the process, it has also been proposed to react the exhaust gas from the melting vessel in a reactor with carbon-containing substances, preferably with coal dust and with water vapor and/or carbon dioxide and, after conditioning, in particular hot dust removal, mixing it with the reduction gas, some of which is circulated in the reduction stage in a circuit including a gas processing system, and using it for the direct reduction of the iron oxide-containing raw materials, as described in U.S. Pat. No. 4,007,034.

Also known is a process which is characterized by the combination of various measures and in which the fine-grained iron ores are preheated in a countercurrent heat exchanger at 500° to 850° C. The fine-grained iron ores are reduced to sponge iron with the exhaust gases of the melting process, almost exclusively carbon monoxide, in a fluidized bed reactor at 500° to 850° C. This sponge iron has a degree of metallization from 40% to 95%. The sponge iron is then separated from the reduction gas, with the remainder of the reduction and the melting taking place in an iron melt in which oxygen, sponge iron and carbon carrier are introduced into the iron melt through multi-jacket nozzles disposed below the bath surface. The remaining reduction and the melting of the sponge iron take place in the melting vessel from which part of the molten iron is removed continuously. This is described in U.S. Pat. No. 4,045,214.

SUMMARY OF THE INVENTION

It is an object of the present invention to improve the prior art processes and to create the prerequisites for the economical use of all types of coal from a low gas anthracite to a gas rich bituminous coal in an integrated process, something that has not been possible in the past. The direct reduction process, which is to be integrated in the total process, is to be a fine grain reduction process in which the ore can be used in a particularly cost effective manner without prior agglomeration. Finally, not only the latent and specific heat of the exhaust gas of a melt gasifier is to be utilized as much as possible within the integrated total process, and energy and cost consuming process steps, such as, for example, a $CO_2$ wash, are to be avoided, but operation should also be possible in temperature ranges which are particularly favorable for reduction kinetics and thus for the entire process.

A process of producing iron from fine-grained iron ore by direct reduction, which includes adding oxygen, sponge iron and at least one of slack coal fines and low-temperature carbonized coal to an iron bath in a melt gasifier to produce a reducing gas, regulating the temperature of the reducing gas by blowing slack coal fines into it to produce a cooled reducing gas and a low-temperature carbonized coal, separating the low-temperature carbonized coal from the cooled reducing gas in order to use the separated low-temperature carbonized coal in the melt gasifier, preheating a fine-grained iron ore with a used reducing gas containing carbon monoxide to a temperature from 450° to 700° C., and reducing the preheated fine-grained iron ore with the cooled reducing gas at a temperature from 700° to 1100° C. in at least one fluidized bed to produce sponge iron and used reducing gas containing carbon monoxide, wherein the step of preheating the fine-grained iron ore results in decomposition of at least part of the carbon monoxide contained in the used reducing gas, producing a carbon layer on the preheated fine-grained iron ore, and also producing an exhaust gas and additional heat.

This process is not only extremely economical; it also provides an opportunity, in particular, for the use of types of coal which could not be used in the past.

In addition, the dependent claims define further suitable and advantageous features of the invention.

BRIEF DESCRIPTION OF THE DRAWINGS

The process according to the invention will be described in greater detail below with reference to the drawings.

DESCRIPTION OF THE PREFERRED EMBODIMENTS

Figure 1:
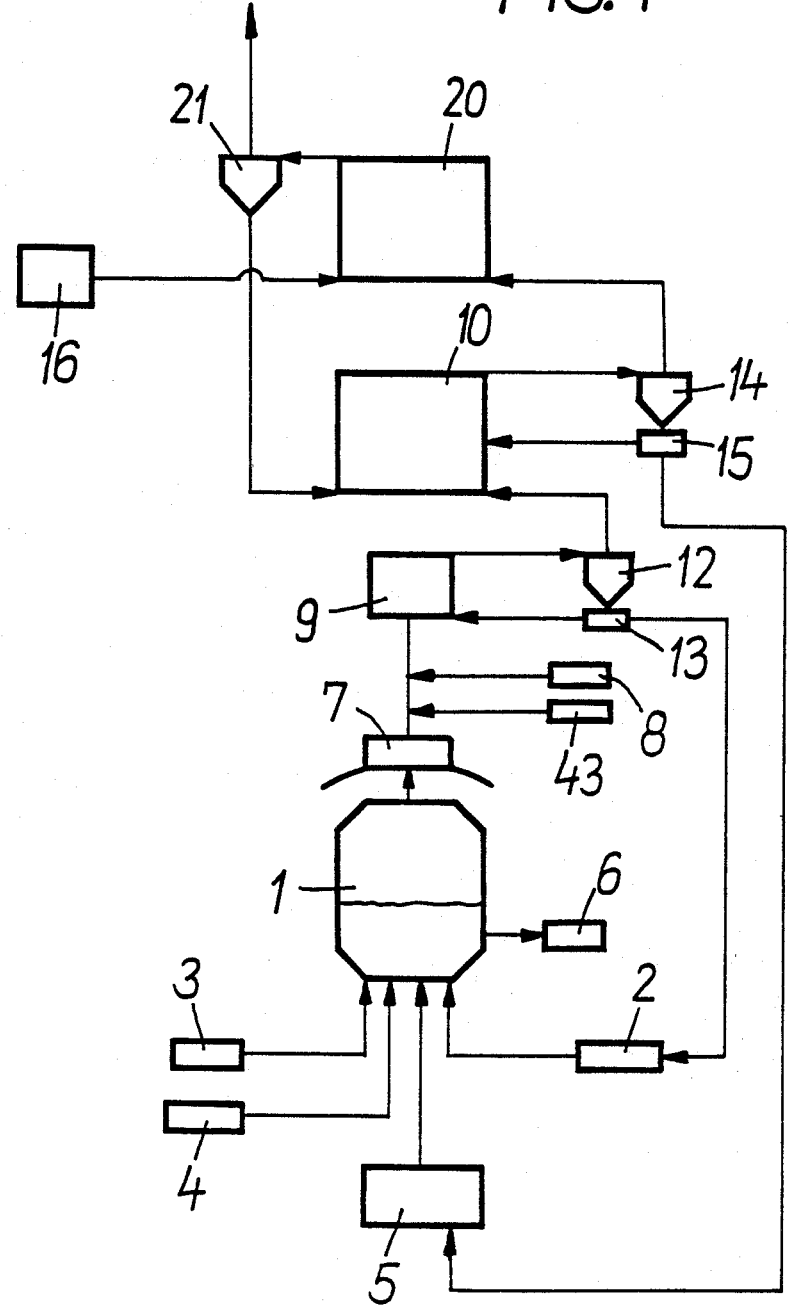
FIG. 1 is a schematic diagram of apparatus for carrying out the process of the invention.

According to the process scheme shown in FIG. 1, a melt gasifier 1 receives low-temperature carbonized coal from a pressure feeder 2 and supplemental thereto non-carbonized coal fines from a bunker 3 together with oxygen from conduit 4. In melt gasifier 1, there is disposed an iron bath formed by melting sponge iron which has been produced in the process in a manner to be described in detail below. The sponge iron is fed to melt gasifier 1 from bunker 5 together with additives not identified in detail so as to form a basic slag corresponding to known steel melting technologies.

The coal fines which are introduced into the iron bath from bunkers 2 and/or 3, preferably pneumatically by means of a so-called COIN nozzle, is reacted in the iron bath with oxygen from conduit 4 to form carbon monoxide and hydrogen. The heat released thereby serves to melt further added sponge iron. The molten iron and the resulting slag are removed via discharge 6. The gas formed in the iron bath by the reaction of coal fines and/or fine-grained low-temperature carbonized coal and oxygen—such gas being composed primarily of carbon monoxide and hydrogen—leaves the melt gasifier at the temperature of the iron bath through a gas collecting hood 7 which sealingly covers the melt gasifier.

Coal fines from a dosaging bunker 8 is added in measured quantities to the gas flowing at the melt temperature so that a gas temperature develops downstream of a low-temperature carbonization path 9 sufficient to maintain the reduction temperature in a finish reduction stage 10. No more of the coal fines are added than a quantity sufficient to maintain the heat economy in melt gasifier 1. If this quantity of coal fines does not produce sufficient cooling of the reduction gas, additional coal fines can be added from dosaging bunker 8 together with stoichiometric quantities of water vapor so that these coal fines are additionally completely gasified in low-temperature carbonization path 9. Carbon dioxide may also be added to produce further cooling. Water vapor or carbon dioxide can be taken from conduit 43.

The coal not converted to gas in low-temperature carbonization path 9 is separated from the gas phase in a cyclone system 12. If the volatile components are not yet sufficiently separated, a partial stream may be returned to low-temperature carbonization path 9 via flow divider 13. The other partial stream, or if the separation of volatile components is complete, the entire quantity of low-temperature carbonized coal, from cyclone system 12 is fed to bunker 2.

To measure out the quantity of coal fines to be added to the hot gas and to implement the low-temperature carbonization reaction with the use of excess heat, an apparatus can preferably be employed as disclosed, for example in U.S. Pat. No. 4,215,101; however, other dosaging systems can also be used.

The reduction gas, substantially freed of low-temperature carbonized coal in cyclone system 12, is introduced into reduction stage 10 for the purpose of reduction. A process stage 20 to be described in detail later is connected upstream of reduction stage 10 and is in communication with a further cyclone system 14 and a switch 15. A bunker 16 supplies the fine-grained ore to stage 20 and a third cyclone system 21 separates the gas coming from process stage 20 from the solids contained therein.

Figure 2:
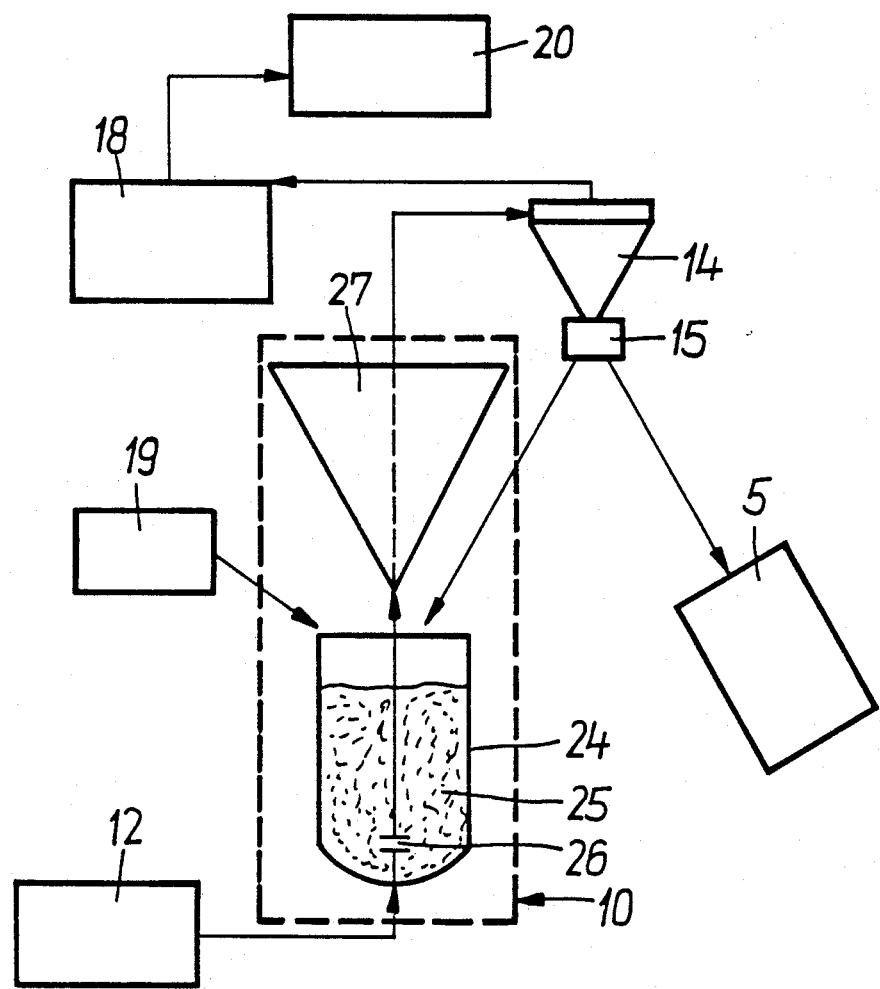
FIG. 2 is a schematic representation of the reduction stage of the apparatus of FIG. 1.

FIG. 2 shows an apparatus for charging the reduction gas in measured quantities with the pretreated ore to be reduced and for implementing the finish reduction. The reduction stage is marked by dashed lines. In a dosaging gap 26, the ore is added from process stage 20 to be described in detail below through a conduit 19 and dosaging member 24 to the reduction gas flowing from cyclone system 12, with the dosaging being effected by the height of a feed column 25. With increasing height of feed column 25, the amount of solids in the reduction gas in dosaging gap 26 increases. The reduction gas transfers part of its heat to the solids so that the solids temperature increases to the reduction temperature of 700° to 1100° C. The reduction gas charged with the solids to be reduced flows into a turbulence funnel 27 and there forms a supercritical fluidized bed. In a particularly advantageous embodiment of the invention, a plurality of series-connected turbulence funnels may be employed to extend the period of dwell.

The solid material discharged from the supercritically operated turbulence funnel(s) is substantially separated from the gas in cyclone system 14 and is returned, via switch 15, either to dosaging member 24 to form feed column 25 or, if the degree of reduction is sufficient, is transferred to sponge iron bunker 5. If necessary, two or more units as shown in FIG. 2 can be connected in series, with reduction gas and solids being conducted in directions opposite to one another between these units. In that case, the fresh reduction gas from cyclone system 12 is fed into the last reduction unit, seen in the direction of flow of the solid material.

Figure 3:
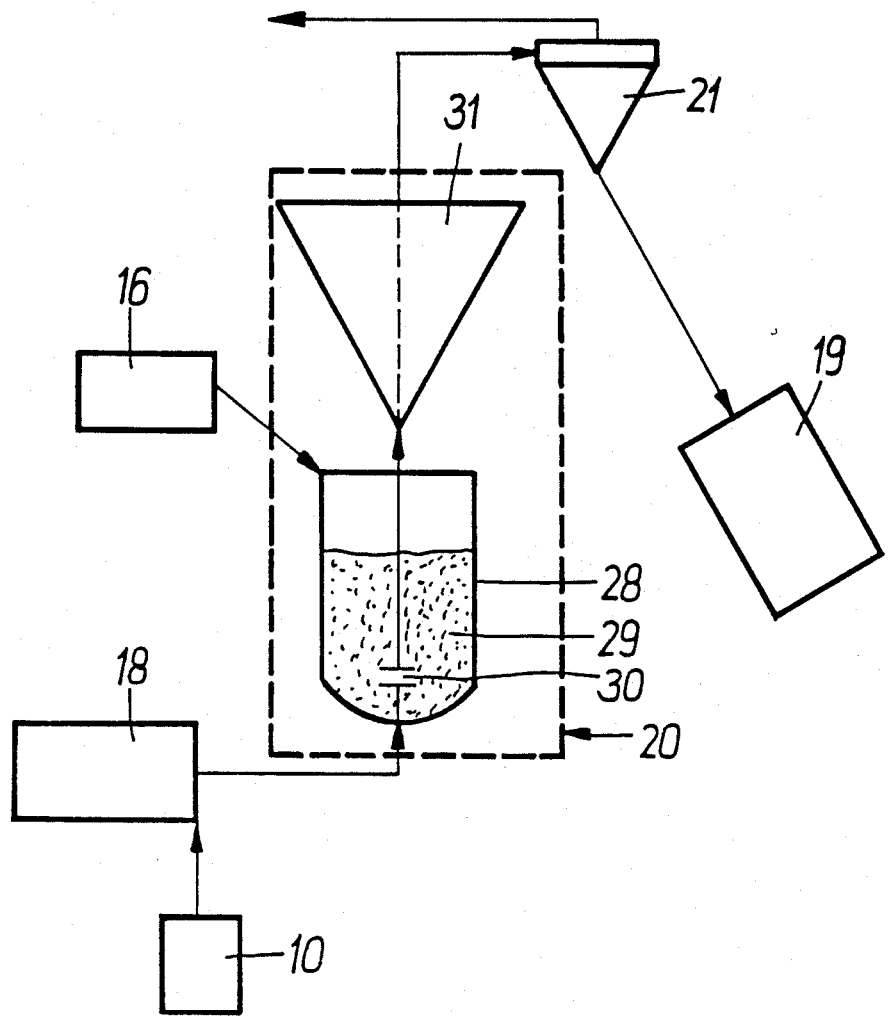
FIG. 3 shows another embodiment of the reduction stage.

Once the desired degree of reduction has been set, the gas freed of its solids in cyclone system 14 still contains some carbon monoxide and hydrogen. In the further process stage 20 which is shown in dashed lines in FIG. 3, this gas is brought into contact with fresh cold ore from bunker 16. The temperature at this step is controlled to favor splitting of carbon monoxide into C and $CO_2$. The sequence of such a reaction is described in "Stahl und Eisen" [Steel and Iron], Volume 79, No. 3, pages 129–134. The solids charge of the gas flowing from reduction stage 10 through gas conduction system 18 into a dosaging member 28 is determined by way of the height of a feed column 29. Any excess heat from the decomposition of carbon monoxide is discharged through heat exchanger surfaces in a turbulence funnel 31. To extend the period of dwell of the gas, a plurality of the turbulence funnels shown in FIG. 3 may be connected in series. Finally, the gas is separated from the solids in cyclone system 21 and is decontaminated by way of a system of chambers. The solids reach reduction stage 10 through conduit 19.

One embodiment of the invention was reduced to practice in the following manner.

420 kg of low-temperature carbonized coal which had been carbonized with the excess heat of the gas generated in melt gasifier 1 was fed into melt gasifier 1 containing a liquid iron bath. Additionally, 400 $m_n^3$ oxygen, 40 kg lime and 1 ton of fine-grained sponge iron were added, with the sponge iron containing 85 kg carbon which had precipitated on the sponge iron particles. The sponge iron had been produced in a reduction process with the use of the reduction gases generated in melt gasifier 1 and had a degree of metallization of 90%. The result was 0.9 ton iron and 0.18 ton slag which were removed from the melt gasifier.

The reduction gas generated in the melt gasifier had a temperature from 1550° to 1580° C. and was primarily composed of carbon monoxide and hydrogen in addition to small percentages of nitrogen and carbon dioxide and other gaseous substances formed from the components contained in the coal. The hot gas was mixed with 600 kg coal containing 30% volatile components.

After low-temperature carbonization, 420 kg low-temperature carbonized coal was separated from the gas by way of cyclone system 12 and was used further in the melt gasifier. After separation of the low-temperature carbonized coal, the entire coal throughput had produced a quantity of gas of about 1000 $m_n^3$ containing approximately 80% CO and 20% $H_2$. The reduction system was here composed of two series-connected units of process stage 10 described in connection with FIGS. 1 and 2. The gas freed of the coal fines was initially fed to the second reduction unit, when seen in the direction of the flow of the solids. Here the solids from the preceding reduction stage were reduced to a degree of metallization of about 90%. The gas freed of solids in a cyclone system 14 had a composition of approximately 56% CO, 15% $H_2$, 24% $CO_2$ and 5% $H_2O$. The gas was conducted into the first reduction stage, which corresponds to process stage 10, and was there charged with the solids from process stage 20. After separation of the solids in cyclone system 14, the composition of the gas was approximately 43% CO, 12% $H_2$, 37% $CO_2$ and 8% $H_2O$. The gas was transferred to process stage 20 where CO decomposition occurred and the separated, prereduced solids were fed to the subsequent reduction stage. In the CO decomposition stage, a quantity of heat was removed through heat exchangers and the temperature in the supercritically operated fluidized bed system 31 in the process was set at about 550° C. by regulating the charging of the gas with fresh solids. The period of dwell of the gas in this temperature range was about 11 seconds. Then, due to 85 kg carbon splitting off from CO, the gas had a composition of 12% CO, 13% $H_2$, 64% $CO_2$ and 10% $H_2O$. The decomposition reaction reduced the gas quantity to about 840 $m_n^3$. On the surface of the fine-grained ore, the split-off carbon formed a firmly adhering layer which could also not be reduced in later reduction stages so that the entire integrated process was free from the interference of sticking phenomena.

It is to be understood that various other modifications will be apparent to and can readily be made by, those skilled in the relevant art without departing from the scope and spirit of this invention. Therefore, it is not intended that the scope of the claims appended hereto be limited to the description as set forth herein, but rather that the claims be construed as encompassing all the features of patentable novelty.

We claim:

1. A process of producing iron from fine-grained iron ore by direct reduction, comprising:
   adding oxygen, sponge iron and at least one of coal fines and low-temperature carbonized coal to an iron bath in a melt gasifier to produce a reducing gas;
   regulating the temperature of said reducing gas by blowing coal fines into it to produce a cooled reducing gas and a low-temperature carbonized coal;
   separating said low-temperature carbonized coal from said cooled reducing gas and adding said separated low-temperature carbonized coal to said melt gasifier;
   reducing a fine-grained iron ore with said cooled reducing gas at a temperature from 700° to 1100° C. in at least one fluidized bed to produce sponge iron and used reducing gas containing carbon monoxide;
   wherein prior to being reduced, said fine-grained iron ore is preheated with said used reducing gas at 450° to 700° C. and said step of preheating the fine-grained iron ore results in decomposition of at least part of the carbon monoxide contained in the used reducing gas, producing a carbon layer on said preheated fine-grained iron ore, and also producing an exhaust gas and heat.

2. A process of producing iron from fine-grained iron ore as defined in claim 1, wherein said regulating step comprises blowing in a quantity of coal fines that is no more than is necessary to add to said melt gasifier in order to generate enough heat to melt the sponge iron, to perform a reduction in said melt gasifier, and to compensate for heat losses in said melt gasifier.

3. A process of producing iron from fine-grained iron ore as defined in claim 2, wherein said regulating step comprises blowing in additional coal fines with a stoichiometric amount of water vapor to further reduce the temperature of said reducing gas.

4. A process of producing iron from fine-grained iron ore as defined in claim 3, wherein said regulating step comprises introducing a quantity of carbon dioxide to further reduce the temperature of said reducing gas.

5. A process of producing iron from fine-grained iron ore as defined in claim 1, wherein the ore has a grain size less than 2 mm.

6. A process of producing iron from fine-grained iron ore as defined in claim 5, wherein the ore has a grain size of less than 200 μm.

7. A process of producing iron from fine-grained iron ore as defined in claim 6, wherein said reducing step is performed at a temperature between 800° and 900° C.

8. A process of producing iron from fine-grained iron ore as defined in claim 1, wherein part of the coal used in the melt gasifier is fine-grained low-temperature carbonized coal removed from the reduction gas.

9. A process of producing iron from fine-grained iron ore as defined in claim 1, comprising the additional step of preheating the coal fines with at least part of the additional heat produced during the step of preheating the ore.

10. A process of producing iron from fine-grained iron ore as defined claim 3, comprising the additional step of preheating the water vapor with at least part of the additional heat produced during the step of preheating the ore.

11. A process of producing iron from fine-grained iron ore as defined in claim 1, wherein said step of adding sponge iron comprises introducing said sponge iron pneumatically in a stream of nitrogen, at a temperature up to 700° C.

12. A process of producing iron from fine-grained iron ore as defined in claim 1, wherein said preheating step precipitates at least 2 to 15% by weight of carbon on the fine-grained ore.

13. A process of producing iron from fine-grained iron ore as defined in claim 1, wherein the used reducing gas in the step of preheating the ore has a period of dwell up to 15 seconds in a temperature range from 400° to 600° C.

14. A process of producing iron from fine-grained iron ore as defined in claim 1, wherein said step of preheating the ore takes place in a fluidized bed reactor.

* * * * *